W. I. OESCHGER.
GAGE.
APPLICATION FILED OCT. 19, 1916.
1,267,584.
Patented May 28, 1918.
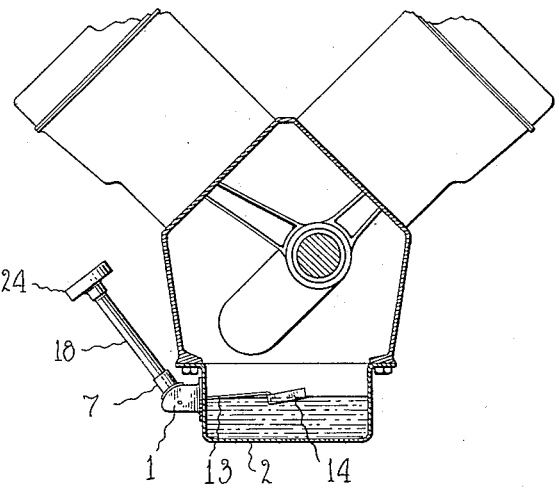
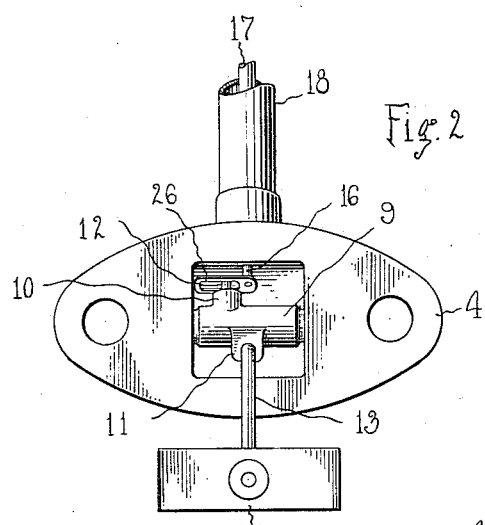
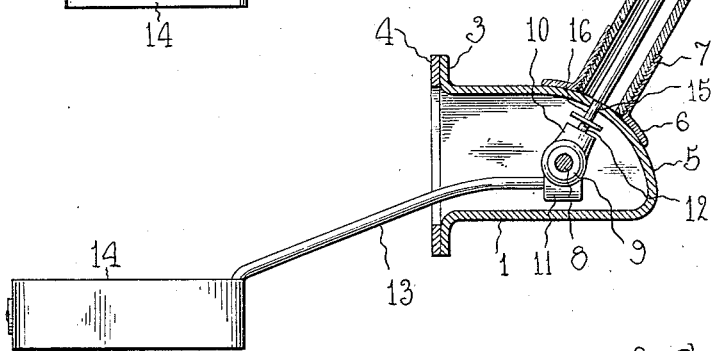
Witnesses
Arthur F. Draper
Karl H. Butler
Inventor
Walter I. Oeschger
By
Attorneys

UNITED STATES PATENT OFFICE.

WALTER I. OESCHGER, OF DETROIT, MICHIGAN, ASSIGNOR, BY MESNE ASSIGNMENTS, TO NATIONAL GAUGE & EQUIPMENT COMPANY, OF LA CROSSE, WISCONSIN, A CORPORATION OF WISCONSIN.

GAGE.

1,267,584.　　　　　Specification of Letters Patent.　　Patented May 28, 1918.

Application filed October 19, 1916. Serial No. 126,487.

*To all whom it may concern:*

Be it known that I, WALTER I. OESCHGER, a citizen of the United States of America, residing at Detroit, in the county of Wayne and State of Michigan, have invented certain new and useful Improvements in Gages, of which the following is a specification, reference being had therein to the accompanying drawings.
This invention relates to gages, and more particularly to a gage attachment for the oil pan, basin or crank case of an internal combustion engine or similar motors.

My invention aims to provide a gage by which the quantity of oil or other lubricant in the oil pan of a motor can be easily and quickly determined, especially when the oil pan is in an inaccessible or inconvenient location. For instance, motors of V type used in connection with an automobile have oil pans comparatively low and inaccessible for the convenience of observation or reading of an ordinary gage, and it is practically impossible to use certain types of gages as the angularity of the cylinders of a motor of this type interfere with their installation. To permit of a gage being easily and conveniently positioned relative to the cylinders of a motor of the V-type, I have devised a novel oil pan connection, and irrespective of the inclination of an engine cylinder, a gage can be conveniently positioned to determine the quantity of oil in the pan or crank case or other place relative to the same.
With such and other conditions existing as indicated above, I have also devised novel means, including a mechanical movement, which permits of the gage being actuated irrespective of its position relative to the oil pan or crank case of a motor. The gage is float actuated and the mechanism for transmitting movement from the float to the indicator is of such simple and durable design that it can be easily installed to withstand the vibrations of a motor and at the same time insure precision as to the quantity or level of a lubricant in the pan or crank case of a motor.

Other matters will appear when describing the construction of the gage, the installation thereof, and reference will now be had to the drawings, wherein—

Figure 1 is a cross sectional view of a crank case or oil pan equipped with my improved gage;

Fig. 2 is an enlarged end view of the gage, partly broken away, and

Fig. 3 is a side elevation of the same, partly broken away and partly in section.

In the accompanying drawings, 1 denotes a connection adapted for attachment to an oil pan or crank case 2, and said connection may have for its mechanical equivalent, a compartment or branch of the oil pan or crank case. The connection 1 has the inner end thereof open and provided with a flange 3 which is stiffened or reinforced by an apertured plate 4 spot welded or otherwise suitably connected to the flange. After providing the oil pan or crank case 2 with an opening, preferably in the side wall thereof, the inner end of the connection may be suitably connected to the wall of the oil can or crank case, thus establishing a communication which is essential in order that a gage supported by the connection may be operated by a float.

The connection may be pressed and stamped from sheet metal or otherwise formed and the outer end of said connection terminates in a nose or convex supporting face 5 to which may be spot welded or otherwise secured the flange 6 of a tubular socket member 7.

Mounted transversely of the connection 1 and intersecting the longitudinal axis of the tubular socket member 7 is a shaft or pin 8. Loose on said shaft or pin is a rocker hub or barrel 9 provided with offset enlargements or bosses 10 and 11. The former has a stud or crank 12, and the latter a float arm 13 extending out of the open end of the connection 1 and through the apertured plate 4. The float arm 13 is tangential of the rocker hub 9 and said arm is suitably connected to a float or buoyant body 14. As a matter of good construction, it is preferable to slightly bend the float arm, at the connection 1, whereby the float end of said arm will extend well into the bottom portion of the oil pan or crank case, and it is also preferable to mount the end of the float arm in the float or buoyant body 14 to firmly hold and maintain said float in substantially a horizontal position.

The convex wall of the connection 1 has an opening 15 in the longitudinal axis of the socket member 7 and this opening receives the reduced lower end 16 of a pointer or indicator shaft 17. This pointer shaft is disposed longitudinally of a gage tube 18 detachably mounted in the socket member 7 and said tube has the outer end thereof provided with a gage head. The gage head comprises a cup 19, containing a dial 20, a thick gasket 21, a transparent plate 22, a thin gasket 23, and an apertured cap 24, these elements or parts being assembled to be firmly held by the tube 18. The dial 20 is graduated to designate quantities or levels of oil in the pan or crank case 2, and movable over said dial is a hand or pointer 25 disposed as a crank on the end of the shaft 17 within the gage head.

The convex wall of the connection 1 serves as a thrust bearing for the pointer shaft 17 and the reduced end 16 of said shaft has a slotted crank 26 into which extends the stud 12 forming part of the rocker hub 9. By reference to Fig. 2, it will be observed that the float arm 13 is in the same vertical plane as the pointer shaft 17 and that the stud 12 is offset relative to the vertical plane whereby a rocking movement of the hub 9 will oscillate the slotted crank 26 and impart a similar movement to the pointer shaft 17, thus allowing a raising or lowering movement of the float 14 within the oil pan 2 to swing the pointer 25 within the gage head and indicate the quantity or level of oil within the pan or crank case 2.

An installation of the gage is clearly shown in Fig. 1, in connection with a motor of the V type. This view illustrates the importance of the convex wall of the connection 1, as it is by virtue of such wall that the gage tube 18 can be set at a desired angle or inclination relative to the crank case or engine cylinder. It is possible to manufacture the connection, *per se*, common to all oil pans, or crank cases, and afterward set the socket member 7 at a desired angle or inclination. It is therefore imperative that the convex wall of the connection 1 be described on an arc having for its center the shaft or pin 8, thus permitting of the gage tube being disposed radially of said shaft or pin, and the wall of said connection can be provided with such openings or slots as will permit of the pointer shaft being correctly positioned.

In some instances, the shaft or pin 8 may be journaled in the connection 1 and the rocker hub 9 fixed thereon, and in either instance, the elements 8, 9, 13 and 17 constitute float actuated means for imparting movement to a gage pointer or indicator. When used in connection with the oil pan of the motor of an automobile, the gage tube 18 can be made of a length and positioned upon the connection 1 whereby the gage head can be easily observed and read by simply raising the engine hood or cover.

What I claim is:—

1. A gage comprising a hollow connection adapted for attachment to an oil pan, a convex wall forming part of said connection, a gage mounted upon said wall, gage operating means extending into said hollow connection and including a slotted crank, and float actuated means extending into said connection to engage said slotted crank and impart movement to said gage.

2. The combination with a gage having a tube, and a pointed shaft therein, of a hollow connection adapted for attachment to an oil pan, means for attaching said gage tube to said connection at a desired angle relative thereto, and means in said connection adapted to impart movement to said pointer shaft.

3. An oil gage comprising a hollow connection having a convex wall, a gage supported by the wall of said connection at a desired angle relative thereto, a pointer shaft forming part of said gage and extending into said connection, a slotted crank carried by said shaft within said connection, and rocking means within said connection adapted to engage said slotted crank to impart movement to said shaft.

4. An oil gage comprising a hollow connection having a convex wall, a socket member mounted on the wall of said connection, a gage carried by said socket member and having a pointer shaft extending into said connection, and a float actuated rocker hub in said connection and adapted to impart movement to the pointer shaft thereof.

In testimony whereof I affix my signature in presence of two witnesses.

WALTER I. OESCHGER.

Witnesses:
ANNA M. DORR,
KARL H. BUTLER.